(12) United States Patent
Wannamaker et al.

(10) Patent No.: US 10,268,996 B1
(45) Date of Patent: Apr. 23, 2019

(54) CUSTOMIZED PAYMENT MANAGEMENT

(71) Applicants: John D. Wannamaker, La Crosse, WI (US); Erica S. Bjornsson, San Francisco, CA (US); Calum G. Murray, Santa Rosa, CA (US); John Robert Shapiro, San Francisco, CA (US)

(72) Inventors: John D. Wannamaker, La Crosse, WI (US); Erica S. Bjornsson, San Francisco, CA (US); Calum G. Murray, Santa Rosa, CA (US); John Robert Shapiro, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 759 days.

(21) Appl. No.: 14/929,195

(22) Filed: Oct. 30, 2015

(51) Int. Cl.
*G06Q 20/10* (2012.01)
*G06Q 20/14* (2012.01)

(52) U.S. Cl.
CPC ............ *G06Q 20/10* (2013.01); *G06Q 20/14* (2013.01)

(58) Field of Classification Search
CPC .... G06Q 20/14; G06Q 20/102; G06Q 20/085; G06Q 30/04
See application file for complete search history.

(56) References Cited

U.S. PATENT DOCUMENTS

| | | | | |
|---|---|---|---|---|
| 2004/0073510 A1* | 4/2004 | Logan | ................. | G06Q 20/102 705/40 |
| 2008/0249934 A1* | 10/2008 | Purchase | ................ | G06Q 20/02 705/40 |
| 2010/0324929 A1* | 12/2010 | Petrasich | .............. | G06F 19/328 705/2 |
| 2013/0144782 A1* | 6/2013 | Eberle | ................... | G06Q 20/102 705/40 |
| 2013/0268307 A1* | 10/2013 | Li | .......................... | G06Q 40/02 705/7.12 |
| 2014/0279452 A1* | 9/2014 | Hitchmoth | ........... | G06Q 20/102 705/40 |
| 2014/0310177 A1* | 10/2014 | Eliscu | ................ | G06Q 20/0425 705/44 |

FOREIGN PATENT DOCUMENTS

CA          2478370 A1 *  2/2005 ............ G06Q 10/06

OTHER PUBLICATIONS

Ze-hao Min, "Analysis of the Nature of Embedded Options of Cash Discounts," Fourth International Conference on Business Intelligence and Financial Engineering, IEEE Computer Society Publication, 2011. (Year: 2011).*

* cited by examiner

*Primary Examiner* — Abhishek Vyas
*Assistant Examiner* — William B. Bunker
(74) *Attorney, Agent, or Firm* — Ferguson Braswell Fraser Kubasta PC

(57) ABSTRACT

A method for payment management includes identifying an invoice for a target financial transaction between a customer and a target vendor, and obtaining financial transaction records for completed financial transactions between the customer and vendors. The vendors include comparable vendors and the target vendor. The method further includes generating, using the financial transaction records, a payment prediction for the customer to pay the target vendor, analyzing a subset of the financial transaction records for the comparable vendors to generate a recommendation, and presenting, in a graphical user interface, the payment prediction and the recommendation.

18 Claims, 9 Drawing Sheets

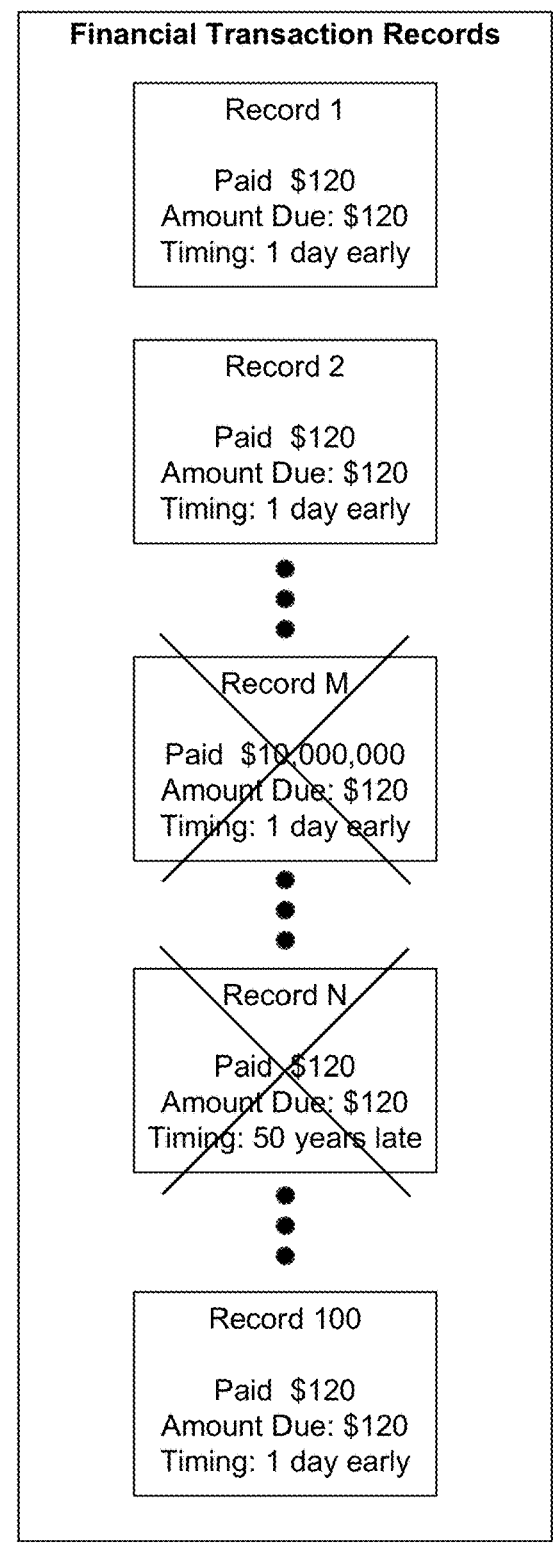
FIG. 5.1

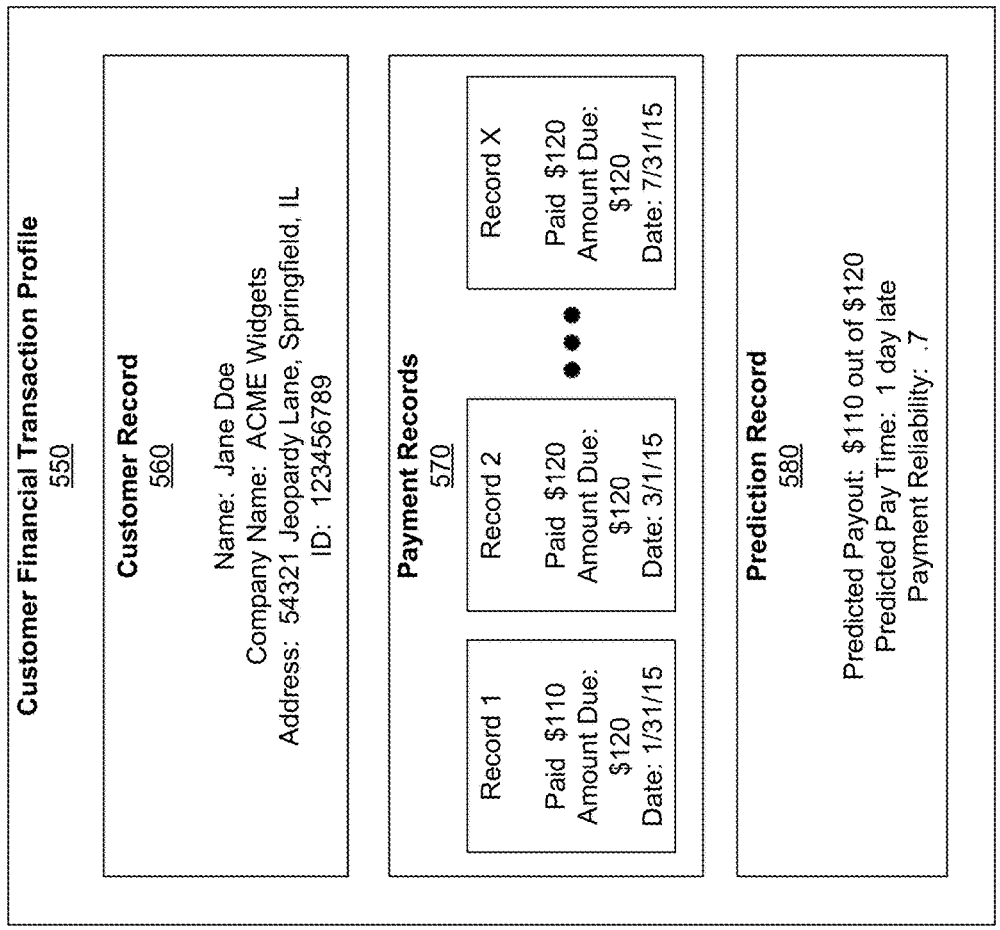
FIG. 5.2

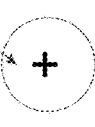
FIG. 6.1

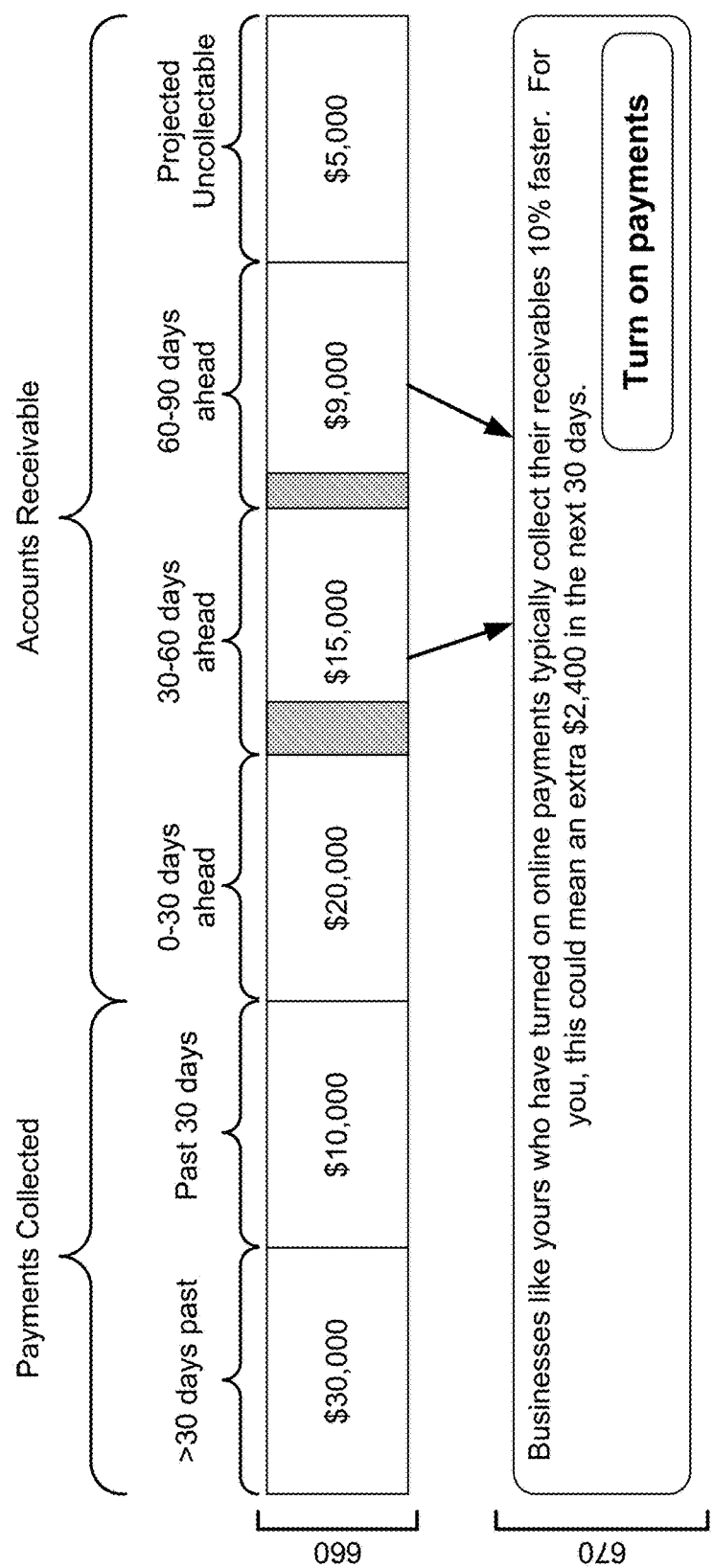
FIG. 6.2

US 10,268,996 B1

CUSTOMIZED PAYMENT MANAGEMENT

BACKGROUND

Computers networks provide a mechanism for entities to communicate business information. One of the types of information are financial transactions that occur between vendors and customers. For example, a vendor may send a customer an invoice for a service rendered, and the customer may respond with a payment. Managing money is an important issue for a vendor, and typically the vendor manages money by considering the only information the vendor may possess, that is, the vendor's own financial transaction information.

SUMMARY

In general, in one aspect, one or more embodiments relate to a method for payment management. The method includes identifying an invoice for a target financial transaction between a customer and a target vendor, and obtaining financial transaction records for completed financial transactions between the customer and vendors. The vendors include comparable vendors and the target vendor. The method further includes generating, using the financial transaction records, a payment prediction for the customer to pay the target vendor, analyzing a subset of the financial transaction records for the comparable vendors to generate a recommendation, and presenting, in a graphical user interface, the payment prediction and the recommendation.

In general, in one aspect, one or more embodiments relate to a system for payment management, the system including, a data repository for storing financial transaction records, a computer processor, and instructions operatively connected to the data repository. The instructions, when executed on the computer processor, identify an invoice for a target financial transaction between a customer and a target vendor. The instructions further obtain financial transaction records for completed financial transactions between the customer and vendors. The vendors including comparable vendors and the target vendor. The instructions further generate, using the financial transaction records, a payment prediction for the customer to pay the target vendor, analyze a subset of the financial transaction records for comparable vendors to generate a recommendation, and present, in a graphical user interface, the payment prediction and the recommendation.

In general, in one aspect, one or more embodiments relate to a non-transitory computer readable medium for payment management. The non-transitory computer readable medium includes computer readable program code for identifying an invoice for a target financial transaction between a customer and a target vendor, and obtaining financial transaction records for completed financial transactions between the customer and vendors. The vendors include comparable vendors and the target vendor. The computer readable program code is further for generating, using the financial transaction records, a payment prediction for the customer to pay the target vendor, analyzing a subset of the financial transaction records for comparable vendors to generate a recommendation, and presenting, in a graphical user interface, the payment prediction and the recommendation.

Other aspects of the invention will be apparent from the following description and the appended claims.

BRIEF DESCRIPTION OF DRAWINGS

FIGS. 5.1, 5.2, 6.1, and 6.2 show examples in accordance with one or more embodiments of the invention.

DETAILED DESCRIPTION

Figure 1:
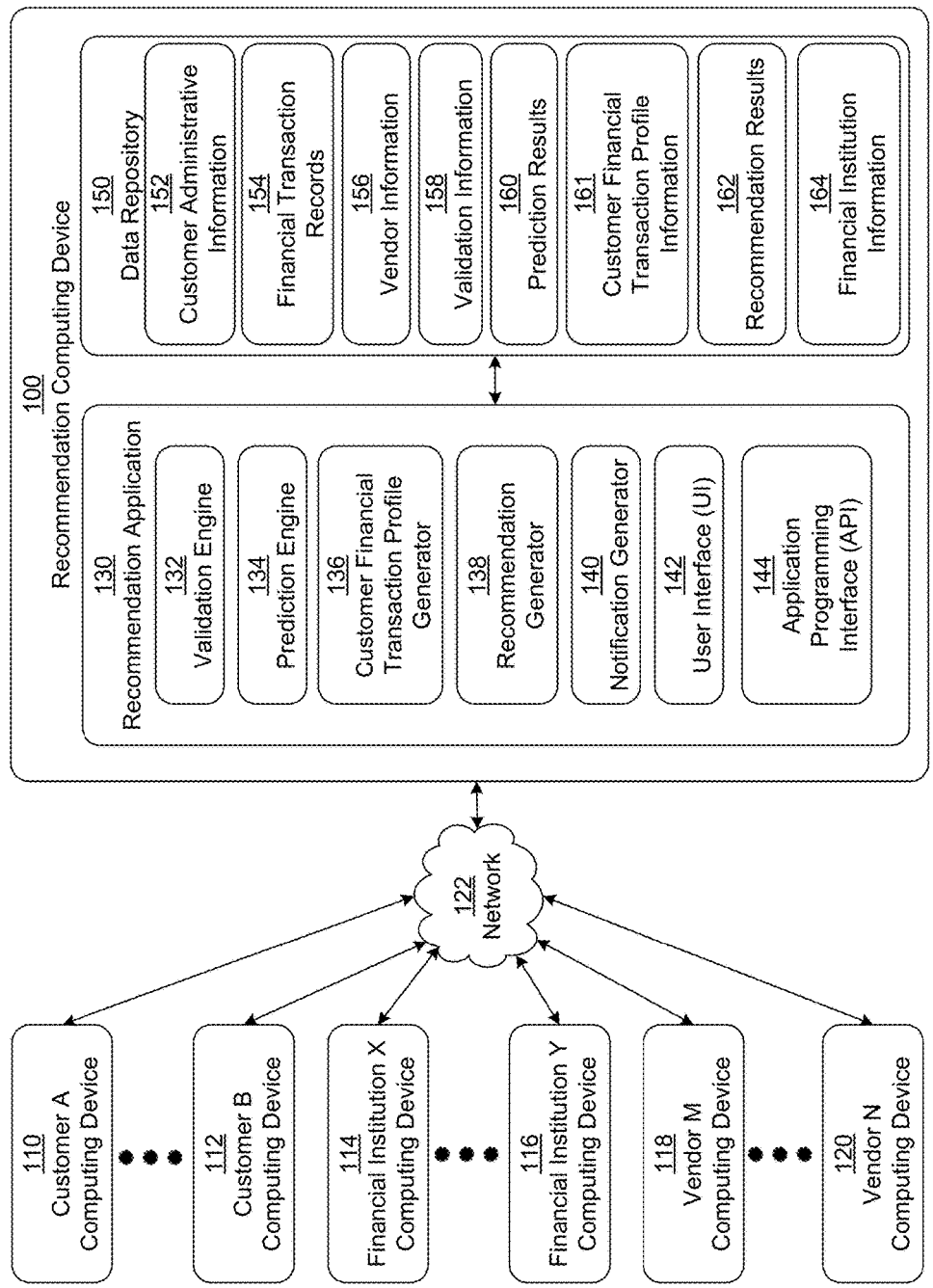
FIG. 1 shows a schematic of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

A user as used herein refers to any human individual or entity that performs an action using a computing device. A user may be deemed to perform an action when an action is performed on behalf of a user.

In general, embodiments of the invention are directed to providing a tool for a vendor to manage cash flow based on timeliness of payments of invoices. Cash flow is the net amount of money being transferred into and out of a business, especially as affecting liquidity. The vendor may send a recommendation request. One or more embodiments of the invention may generate and present one or more recommendations to the vendor. The recommendations are based, at least in part, on payment predictions from customers of the vendor. In other words, the payment predictions correspond to a timeliness of a customer paying the vendor. The recommendations may be created from analyzing cash management options that include, financing, investing, change of payment type, change of payment terms, and other options. Generally, one or more embodiments of the invention assess one or more of the cash management options, in part, from analysis of customer behavior with not only the vendor, but a group of comparable vendors (described below).

In one or more embodiments of the invention, a financial institution is a financial entity that acts as an intermediary between the customer and the vendor for the financial transaction of money. For example, the financial institution may be a bank, a credit card company, or other financial institution. Moreover, a financial institution may serve as a lender or underwriter. A financial institution of the customer is a customer's financial institution. A financial institution of the vendor is the vendor's financial institution.

FIG. 1 shows a schematic diagram of a system in accordance with one or more embodiments of the invention. As shown in FIG. 1, the system includes vendor computing device (e.g., vendor M computing device (118), vendor N computing device (120)), customer computing device (e.g., customer A computing device (110), customer B computing device (112)), financial institution computing device (e.g., financial institution X computing device (114), financial institution Y computing device (116)), and recommendation computing device (100). Each of these components is described below.

The various computing devices (e.g., vendor computing device (e.g., vendor M computing device (118), vendor N computing device (120)), customer computing device (e.g., customer A computing device (110), customer B computing device (112)), financial institution computing device (e.g., financial institution X computing device (114), financial institution Y computing device (116)) may be connected via a computing network (122). The computing network (122) is a distributed network of computing systems and may be a wide area, local area network, or a combination thereof. For example, the computing network (122) may be the Internet. Further, the various computing devices may be a computing device shown and described with respect to FIG. 7.

The various computing devices (e.g., vendor computing device (e.g., vendor M computing device (118), vendor N computing device (120)), customer computing device (e.g., customer A computing device (110), customer B computing device (112)), financial institution computing device (e.g., financial institution X computing device (114), financial institution Y computing device (116)) may include or be connected to a financial application. Specifically, the computing device may execute the financial application or may be remotely connected to the financial application, which may be a web application in such embodiments. A financial application is an application that is configured to manage financial transactions. A financial transaction is an exchange of a product (i.e., a good and/or a service) for money. The financial transaction may involve an instant exchange in which payment occurs immediately upon providing the product, delayed payment in which a customer receives an invoice from a vendor, or a combination thereof. Delayed payment may be a promise to pay by the customer to the vendor. Delayed payment may be specified in an invoice. In other words, an invoice is a document memorializing the payment owed by the customer to the vendor. In one or more embodiments of the invention, the invoice may be provided to the customer from the vendor. Further, the vendor may maintain a copy of the invoice. In one or more embodiments of the invention, the financial application includes functionality to generate and store at least one financial transaction record (described below) for each financial transaction.

The financial application may further include functionality to perform additional functions, such as to manage, maintain, and organize financial data. For example, a financial application may assist in performing a financial transaction, performing accounting tasks, filing tax returns, performing business related financial transactions (e.g., billing, payroll, credit card processing), and/or performing other financially related tasks. The financial application may also provide an interface for obtaining financial transaction records. Additionally, two or more of the financial applications may be the same application, the same type of application, or heterogeneous applications.

In one or more embodiments of the invention, a vendor computing device (e.g., vendor M computing device (118), vendor N computing device (120)) is a computing device used by a vendor. A vendor is a provider of one or more products. For example, a product provided by the vendor may be a good, such as plants, tools, or other good, and/or the product may be a service, such as roofing, pool maintenance, and other services. In one or more embodiments of the invention, the vendor may provide various types of products. For example, a cosmetic surgeon vendor may provide rhinoplasty, Botox, liposuction, and other types of plastic surgery.

In one or more embodiments of the invention, a customer is a receiver of one or more products from the vendor. In one or more embodiments of the invention, for each financial transaction, the customer may receive a single product or multiple products. In one or more embodiments of the invention, a customer may owe a monetary amount to the vendor based on the receiving of a product.

Continuing with FIG. 1, the recommendation computing device (100) includes a data repository (150) and a recommendation application (130). In one or more embodiments of the invention, the data repository (150) is any type of storage unit and/or device (e.g., a file system, database, collection of tables, or any other storage mechanism) for storing data. Further, the data repository (150) may include multiple different storage units and/or devices. The multiple different storage units and/or devices may or may not be of the same type or located at the same physical site.

The data repository (150) includes functionality to store customer administrative information (152), financial transaction records (154), vendor information (156), validation information (158), prediction results (160), customer financial transaction profile information (161), recommendation results (162), and financial institution information (164).

In one or more embodiments of the invention, the customer administrative information (152) is information for the vendor to identify and communicate with the customer. Customer administrative information may include contact information, communication preferences, communication history, and other information. For example, customer administrative information (152) may be the customer's first and last name, address, phone number, account number, email address, Facebook address, general availability for receiving calls, the date of the last customer service call, discount codes that the vendor applies to the customer, and other information.

A financial transaction record (154) is a record of a particular financial transaction. A financial transaction record may include a date, monetary amount, description, identifier of one or more parties (e.g., customer, vendor) to the financial transaction, monetary amount, date, category, one or more products transacted, and other information. For example, the financial transaction record may be an invoice, a receipt, a log entry, or any other recording of a financial transaction. In one or more embodiments of the invention, the financial transaction record may include an identifier of each product transacted in the corresponding financial transaction.

The financial transaction record (154) is a record submitted by one or more submitters. A submitter is any individual or group that submits, actively or passively (e.g., through storing in a central data repository), a financial transaction record. For example, the submitter may be a customer, vendor, financial institution, or other entity. In other words, the submitter is a user that submits a financial transaction record (154). In one or more embodiments of the invention, the submitter of the financial transaction may or may not be submitting a valid financial transaction record (154). A valid financial transaction record is an accurate record of an actual financial transaction. An invalid financial transaction record is a financial transaction record that is not valid a financial transaction record. In an example of an invalid financial transaction record, the submitter may manually mistype and submits a $500 payment record for a payment that was actually $400. By way of another example, the financial transaction record may have an incorrect identification of the vendor or customer. In an example of a valid financial transaction record, the submitter uses a correctly performing computing system, which creates a $500 payment record for an actual $500 payment thus a valid financial transaction record.

In one or more embodiments of the invention, the vendor information (156) is information about one or more vendors. A vendor may be a target vendor, a comparable vendor, and/or a non-comparable vendor with respect to a recommendation. A target vendor is a vendor that is the recipient or target of the recommendation. In other words, prediction analysis and management is performed on the target vendor's information. A comparable vendor is a vendor that has one or more similarities with respect to one or more attributes (e.g., industry, business type, location, operation time, other attributes, or combination thereof) with the target vendor. In other words, each vendor may have an associated set of attribute values for a set of vendor attributes. A comparable vendor has attribute values that are within a threshold degree of similarity to the attribute values of the target vendor. The threshold degree of similarity may be defined with respect to the attribute. For example, for geographic location, the threshold may be based on distance, whereas, for class of products, the threshold may be a difference number based on a predefined ordering of product classes. A non-comparable vendor is a vendor that fails to be within the threshold degree of similarity for a threshold number of attributes. By way of an example, consider the scenario in which the target vendor is Plumbing & More based in Tucson, Ariz. Comparable vendors may be plumbing shops in Arizona, electrical companies in Arizona, roofers in Tucson, and other vendors that have invoices generally in a same monetary range as the target vendor.

The vendor information may include a list of vendor records. Each vendor record may include a vendor identifier, a list of customer records, a list of financial transactions records between each vendor and the vendor's customers. A vendor identifier is a unique identifier of a vendor. For example, the vendor identifier may be a name, a corporate address, or any combination of identifiers of the vendor. The list of customer records may include customer administrative information (discussed above) for each customer of the vendor. The list of financial transactions may be a set of financial transaction records for the vendor. In one or more embodiments of the invention, the vendor information may maintain the list of customer records and the list of financial transactions independent of other entities in the system. For example, the vendor may have separate records from the financial institution(s). The list of customer records and list of financial transaction records of different entities may be maintained, together or separately, in a same data repository. In one or more embodiments, financial transaction records between a customer and a comparable vendor may be referred to as a comparable financial transaction records regardless of the submitter.

In one or more embodiments of the invention, validation information (158) is information used to validate the financial transaction records (154), and may include information resulting from the validation. For example, the validation information may include a set of rules that define when a financial transaction is deemed valid. The set of rules may be dependent on parameter values of one or more parameters. In other words, a parameter is a variable that may have a value defined by the financial transaction being validated. The validation information (158) may include, for a rule, parameter thresholds, parameter weights, general parameters identifiers, and other information about a rule. The validation information may include validation results, which may include a list of financial transaction records to ignore, and any other information for performing a validation or pertaining to a validation result. For example, the validation information may have ignore parameters that have the following values: foreign countries, payment values that are a threshold number of standard deviations from a normal payment value, and manual submission.

In one or more embodiments of the invention, a prediction result (160) is the result of analyzing financial transaction records (154) of a particular customer and generating a prediction of the customer's expected payment behavior. The prediction result may include one or more of the following: expected payment time, payment amount, a payment reliability rating, a prediction confidence score (i.e., an assessment of the accuracy of the prediction), or any other information pertaining to a prediction. The expected payment time may be the time and/or date in which payment is expected to be sent and/or received by the vendor. The payment amount may be the amount of money that the customer is expected to pay the vendor. For example, the payment amount may be the amount of the invoice, a percentage of the invoice, or a defined amount. The payment reliability rating is a value, e.g., numeric or on another scale, that defines a degree of reliability of the customer. For example, the payment reliability rating may reflect the degree of variability in the customer's payments. The prediction confidence score may be a numeric value or a value on another scale that defines a degree of confidence in the prediction. The prediction confidence score may be based, for example, on the payment reliability rating and/or the degree of similarity between comparable vendors and the target vendor and comparable financial transaction records and the invoice. By way of an example, consider the scenario in which the comparable financial transactions show that the customer has paid other comparable vendors within one month of receiving an invoice. However, the current invoice of the target vendor is for ten times the amount of any comparable financial transaction record. In such a scenario, the payment reliability rating may be high because the customer pays every invoice in the past timely while the prediction confidence score is low because the current invoice is not as similar to the comparable financial transaction records.

By way of an example of a prediction result, a prediction result may be that the customer will pay 3 days late, $100 less than the amount due, has a "0.7" reliability rating, and includes a 96% confidence score. The prediction result elements may have multiple formats or value types. For example, the payment time may be an absolute time and date, such as "Apr. 15, 2016 at 3:00 pm EDT", or a relative time like "1 day late". For another example, the payment reliability rating may be "3 stars", "80/100", "0.8", "67%", or another rating system.

In one or more embodiments of the invention, customer financial transaction profile information (161) is information pertaining to the generation of a customer financial transaction profile. The customer financial transaction profile is profile of a customer's interactions with regard to financial transactions. Furthermore, the customer financial transaction profile may include analysis, reports, or other information about the customer. The customer financial transaction profile may be defined at multiple levels of granularity based on groupings of information. For example, at the lowest level of granularity, the customer financial transaction profile may include customer administrative information (152), a set of financial transaction records (154), and a set of one or more prediction results (160). At a higher level of granularity, the customer financial transaction profile may include behavioral analysis information, evaluation values (e.g., ratings on a set of information), and other information about the customer. The behavioral analysis information may include information about the customer's payment patterns. For example, the behavior analysis information may specify under what conditions (e.g., in invoice terms) a customer is more likely to pay and what conditions a customer is less likely to pay. A customer payment transaction is a type of customer financial transaction that a customer has paid. At the top level of granularity, the customer financial transaction profile may provide a rating of the customer based on timeliness and amount of payment. For example, the customer financial transaction profile may include a customer's contact information (e.g., Jane Doe, 555-1234, etc.), a list of payment receipts for the last 3 months, a prediction of the amount the customer is expected to pay (e.g. $110 out of $120 due), a prediction of when the customer will pay (e.g., 1 day early), a probability of complete and on-time payment (e.g., 40%), a payment reliability rating (e.g., 3 stars), or other information and combination thereof.

In one or more embodiments of the invention, a recommendation result (162) is the result of a money management option that is recommended to a target vendor. The recommendation result (162) may include one or of the following: a confidence score, a cash management option type (e.g., financing option, payment method change, invoice terms change, investment offer, etc.), data corresponding to the payment type, the expected cash yield, the expected time frame for realizing the cash yield, and any other relevant information for a recommendation. A financing option is an option for the act of providing funds for business activities, making purchases or investing. A payment method change is a modification, addition, or removal of a method of payment, e.g., turning on credit cards, disallowing checks, switching for American Express to Master Card, etc. Invoice terms change is a modification, addition, or removal in one or more terms of the invoice, e.g., a 10% discount on the amount due, a 5 day time limit to pay, and no payment plans. Investment offer is an offer for the vendor to make an investment, e.g., buy a savings bond or a variable-rate certificate of deposit (CD). In an example of a money management option, the user is presented an option of changing payment terms for its customers, in order to raise $5,000; the recommendation result shows a "94" confidence score for changing the payment terms, where the terms are a 10% discount for 30 days; and expecting an increase of $6,234 from customers within 30 days.

In one or more embodiments of the invention, the financial institution information (164) is information on financial institutions. The financial institution information may include one or more of the following: contact information, account information, financing information, financial transaction information, and other information.

In one or more embodiments of the invention, a recommendation application (130) is connected to the data repository (150). The recommendation application (130) includes functionality to retrieve data, including financial transaction records (154) from the data repository (150). In one or more embodiments of the invention, the recommendation application includes a validation engine (132), prediction engine (134), customer financial transaction profile generator (136), recommendation generator (138), notification generator (140), user interface (UI) (142), and application programming interface (API) (144).

In one or more embodiments of the invention, the validation engine (132) is hardware, software, firmware, or any combination thereof that includes functionality to retrieve financial transaction records, retrieve validation information (158), and validate financial transaction records (154). Further, the validation engine (132) includes functionality to apply analytics, generate validation information (158), and any other supporting functionality to validate financial transaction records. For example, a customer that lives in Arkansas, has only made transactions within the United States, suddenly has a transaction in expensive transaction in France, and then 2 minutes afterwards has another transaction in Arkansas. The prediction engine may mark the financial transaction record created from France as fraudulent, remove the financial transaction record from the list of comparable financial transaction records, and blacklist the financial transaction record.

In one or more embodiments of the invention, the prediction engine is hardware, software, firmware, or any combination thereof that (134) includes functionality to predict customer financial transaction behavior (i.e., behavior is actions and/or the manner in which the actions are taken), and may include functionality to predict customer payment behavior. Moreover, the prediction engine (134) may include functionality to perform one or more of the following: behavioral analysis (i.e., analysis of behavior), predictive analysis (i.e., analysis to predict behavior), generation of prediction results (160), or other functionality. For example, a behavioral analysis may be performed on the customer's last 50 payment records, and the resulting analysis is that the customer pays 5 days late if paying by cash, and 2 days early if paying by credit card, and the average payment time is 1 day early. Then a predictive analysis is performed, where the prediction engine finds that the customer only accepts cash, then calculates a prediction only on the cash payment records, and then generates the prediction result indicating that the customer will pay 5 days late.

In another prediction example, the prediction engine (134) performs a behavioral analysis on a customer's financial transaction records with a group of comparable vendors, and determines that the customer pays the electricity on day 45, and the consultants on day 70 of each pay period. The prediction engine then performs a predictive analysis, and presents a prediction of payment receipt based on the company type of the vendor. The company type of the vendor may be useful for the prediction, for example, if the vendor a consulting or power company.

In one or more embodiments of the invention, the customer financial transaction profile generator (136) is hardware, software, firmware, or any combination thereof that includes functionality to generate a customer financial transaction profile (161). Furthermore, the customer financial transaction profile generator (136) may include functionality to assemble information for the data repository (150) (e.g., customer administrative information, financial transaction records, prediction results, etc.), assemble behavioral analysis information, generate evaluation values, and perform other functionality.

In one or more embodiments of the invention, the recommendation generator is hardware, software, firmware, or any combination thereof that (138) may include functionality to receive a recommendation request, generate a recommendation result, store a recommendation result (162), and perform other functionality. The recommendation generator may include further functionality to receive a specification for a business opportunity (described below in UI (142) description), analyze one or more cash management options, or other information about the user for generating a recommendation.

For example, the recommendation generator receives from the user, a specification for a business opportunity (e.g., raise $5,000 in 30 days) and recommendation request, then the recommendation generator performs an analysis of cash management options, then returns an option to finance (with a confidence score of 82) and an option to change invoice terms (with a confidence score of 88), and then suggests changing the invoice terms.

In one or more embodiments of the invention, the notification generator (140) includes functionality to notify a vendor about a recommendation. A notification is created, as a result of a recommendation having been created, as a result of certain events occurring, or when certain conditions are met. For example, the recommendation application does an automated and routine cash flow analysis on a vendor's account, and discover that the vendor may run out of cash in 2 weeks; then the recommendation application creates a recommendation and then notifies the vendor of the vendor's cash flow situation, and presents the recommendation.

In one or more embodiments of the invention, the user interface (UI) (142) includes functionality to receive input from a user and present information to the user via a computing device, generally through graphical, text, audio, and/or any other input/output representations. The UI (142) may include any combination of the following: a business opportunity user interface, cash management option user interface, a recommendation report user interface, a cash flow status bar, other user interfaces or any combination thereof.

The business opportunity user interface includes functionality to receive a specification of a business opportunity and present recommendations for funding the business opportunity. The specification for a business opportunity is a set of information that represents the opportunity to earn money. A specification for a business opportunity may be a type of form in the UI (142) for the user to input information. A specification for a business opportunity may include any combination of input fields for cash needed (e.g., cash needed to realize the opportunity), investment type (e.g., the type of investment), expected return from investment (e.g., the amount of cash expected from realizing the investment), time until beginning the opportunity (e.g., how soon the user wants to execute on the opportunity), expected time to realize profit, or other information.

A cash management option shows a title describing the type of cash management (e.g., "QB Financing Offer", "Invoice Terms Change", "Payment Method Change", etc.), a confidence score, a description of the option, and a button (for the user to select the option). A recommendation report includes information on the details of the recommendation and may be displayed on the same screen as a cash flow status bar.

The cash flow status bar may visually show section for cash collected in the past 30 days, a section for receivables for each of the next 3 month, as section for uncollectable receivables, and subsections of receivable that indicated possible faster collections. For example, the recommendation report for invoice terms change may have a dialog box stating "Businesses like yours collect their receivables 10% faster when they offer a 5% discount for 10 days. This could mean an extra $3,000 cash for you in the next 10 days. Would you like to make this change?", a button showing "Yes", another button showing "No", and a cash flow status bar showing $30,000 in total receivables, and a subsection of the bar showing $3,000 in projected faster collection receivables.

The application programming interface (API) (144) includes functionality to provide services of the recommendation application (130) to other software applications, or to the UI of the recommendation application (130). Moreover, the API includes a set of routines, protocols, and tools for building software applications that uses the services of the recommendation application. The company may modify its invoicing application to use the API of the recommendation application, e.g., the company may add a feature to request an invoice terms change recommendation.

While FIG. 1 shows a configuration of components, other configurations may be used without departing from the scope of the invention. For example, various components may be combined to create a single component. As another example, the functionality performed by a single component may be performed by two or more components.

Figure 2:
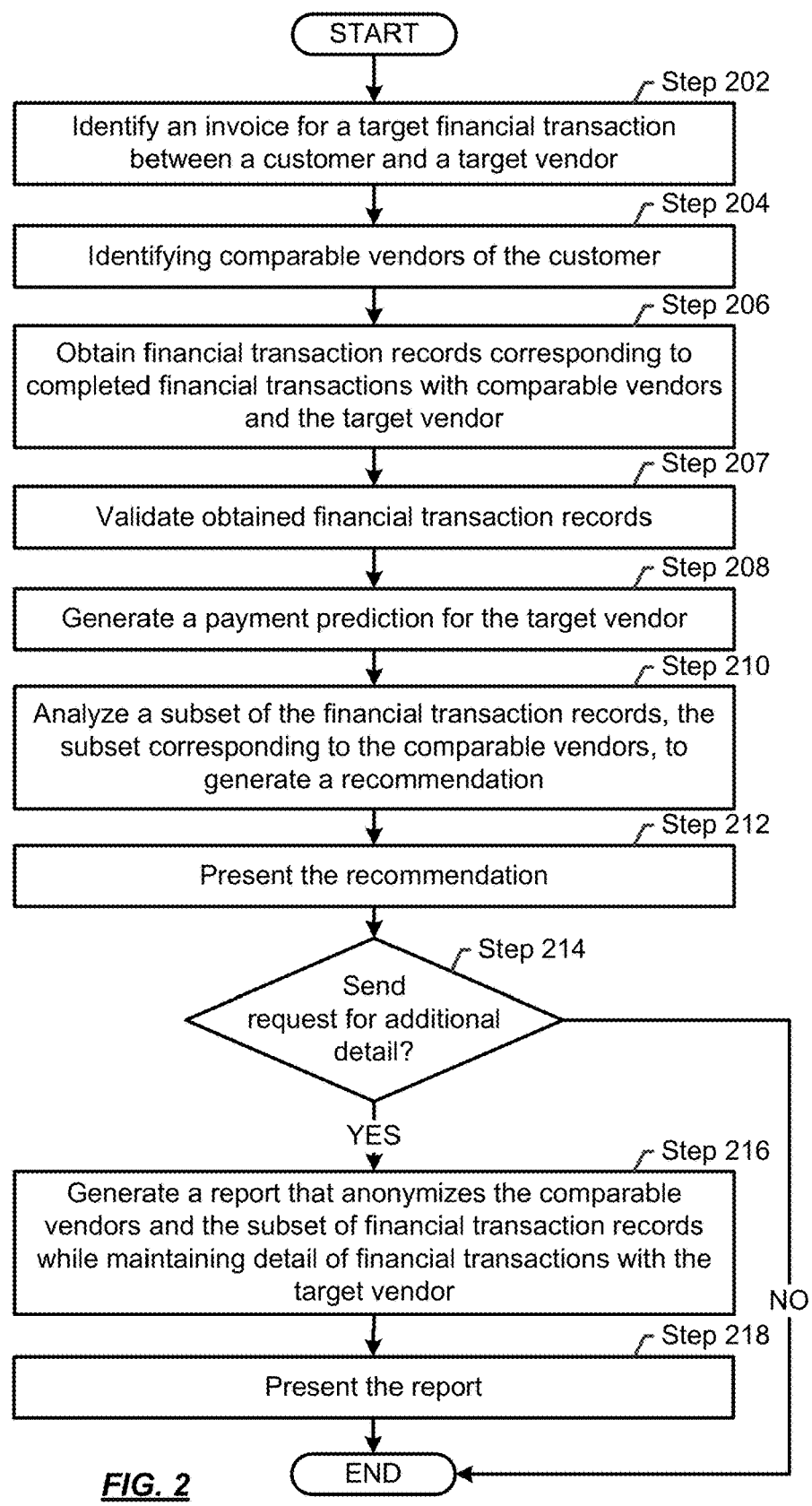
FIGS. 2, 3, and 4 show flowcharts in accordance with one or more embodiments of the invention.
Figure 3:
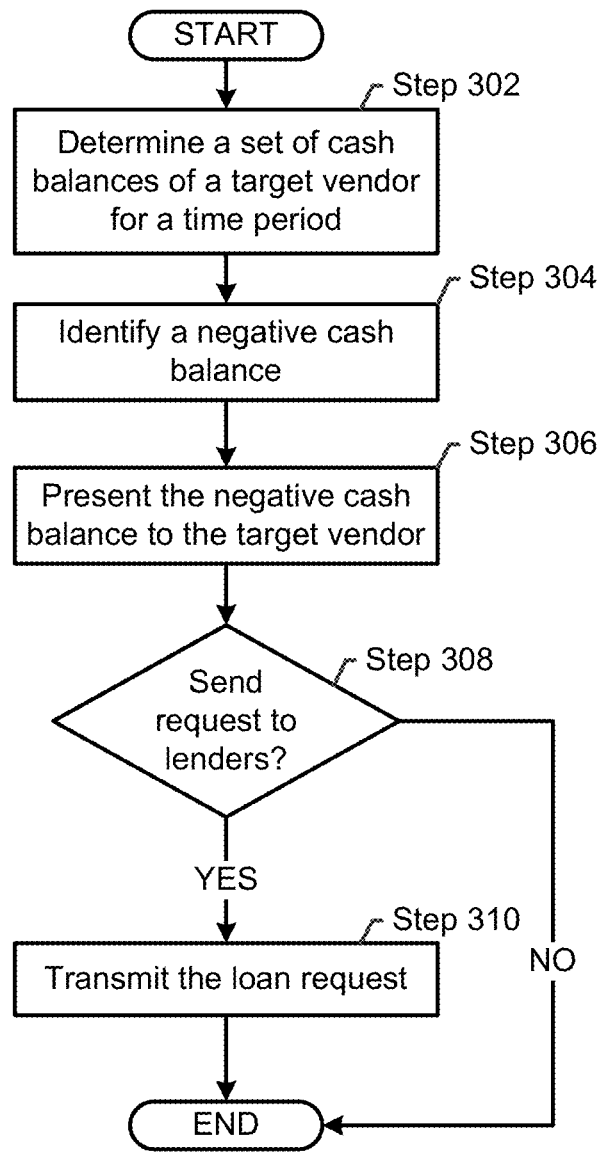
Figure 4:
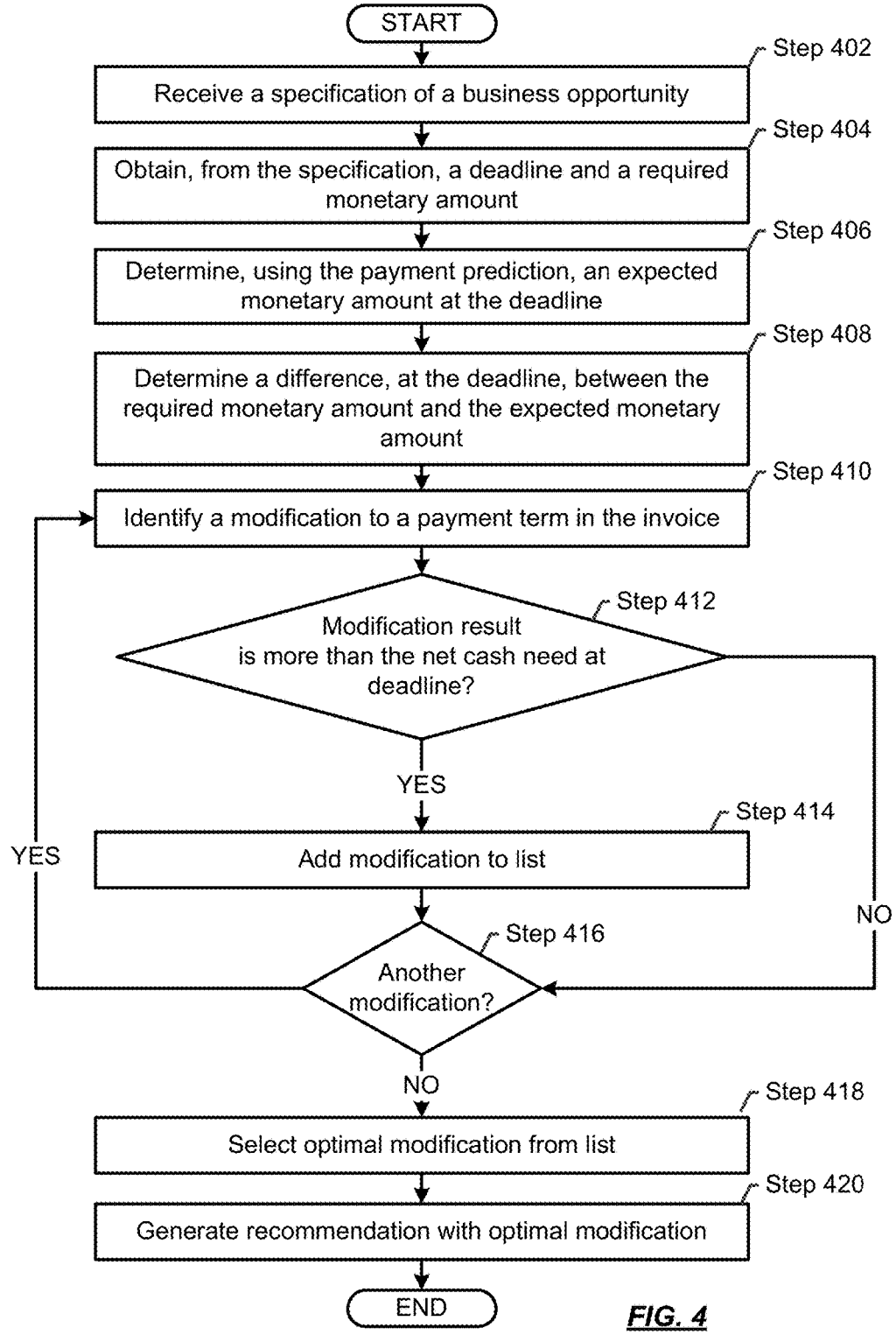

FIGS. 2-4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for customized payment management in accordance with one or more embodiments of the invention. In particular, FIG. 2 shows a flowchart of payment management with a particular customer. In one or more embodiments of the invention, an invoice for a target financial transaction between a customer and a target vendor is identified (Step 202). The invoice may be identified by a vendor sending a recommendation request to the recommendation application, the recommendation application, an external application accessing the recommendation application through the API, or another interested party with access rights to getting a recommendation for the invoice. The recommendation application identifies the invoice using an evaluation technique on the pending invoices in which payment is owed. For example, the evaluation technique may include finding first invoice with outstanding balance, greatest cash flow potential, machine learning, vendor with greatest cash flow need, or using any other evaluation techniques or combination of techniques.

In one or more embodiments of the invention, comparable vendors of the customer are identified (Step 204). Given the financial transaction relationship that already exists between the customer and the target vendor, a set of comparable vendors are found. Identifying comparable vendors may include iterating through each available vendors and comparing the attribute values of the available vendor with the attribute values of the target vendors. If the attribute values are within a threshold degree of similarity, then the available vendor is marked as a comparable vendor. For example, if a financial transaction exists between Chickity Chicken Chain (the customer) and Pure Plump and Proud Poultry (the vendor), and the search criteria is for similar business types in California, an example result may include a list of other chicken suppliers in California, but not any beef suppliers or chicken suppliers from Texas.

In one or more embodiments of the invention, financial transaction records corresponding to completed financial transactions with comparable vendors and the target vendor are obtained (Step 206). The completed financial transactions with comparable vendors are selected as comparable financial transactions. In some embodiments, an additional comparison is performed, such as based on monetary amount of the financial transaction and the invoice. If the financial transaction fails the additional comparison, the financial transaction may be ignored regardless of whether the financial transaction is for a comparable vendor.

In one or more embodiments of the invention, obtained financial transaction records are validated (Step 207). In one or more embodiments of the invention validation may be performed on the set of comparable financial transactions. Validation of financial transaction records confirms the fidelity of financial transaction records thus allowing greater accuracy when predicting customer payment behavior. Generally, validation starts with receiving a set of comparable financial transaction records, then retrieving validation information, then processing validation information, and then performing statistical analysis or other validation techniques. Afterwards, the invalid financial transaction records may be blacklisted, removed, or acted on in another manner. Finally, the financial transaction records are generally stored in the data repository.

One or more of the comparable financial transaction records may have errors that can cause errors in the predictive analysis. For example, a customer always pays one day early, but a clerical error has one financial transaction records indicating that the customer paid 100 years late, then a payment prediction could show that the customer will pay 20 days late. The validation techniques may include one or more of the following: averaging, moving average, payment propensity analysis, use of parameter weights, use of parameter thresholds, scoring, analytics, and any other validation techniques.

A payment prediction for the target vendor is generated (Step 208) in accordance with one or more embodiments of the invention. By using the comparable financial transaction records, one or more embodiments of the invention will produce prediction results. Comparable financial transaction records show a history of transactions thus a history of information. Since a history of information may reveals patterns, analysis of the history of transactions results in one or more predictions. For example, given a set of comparable payment transaction records (i.e., a subset of the comparable financial transaction records), each payment transaction record may include data on a payment amount, amount due, time of payment, and payment due date. The time of payment, is the time, or date, in which the customer pays. A predictive analysis may be performed on the comparable payment transaction records that results in recognizing payment patters, and then a generated prediction. For example, if an averaging technique for the predictive analysis is used, then if the customer has paid one payment on time, one payment 2 days late, and another payment 4 days late, then the average time difference is 2 days late. Therefore, the prediction in this example is that the customer will pay 2 days late for the next payment.

Since the payment prediction results includes expected payment time and expected payment amount, the target vendor can better consider or manage future cash flow. For example, if a customer is predicted to pay 20 days late and only pay $5,000 out of $10,000, and the vendor has $8,000 in business expenses to pay before the on-time payment date, then the vendor will want to know this possible cash flow deficiency, to prevent a disruption to the vendor's business.

A subset of the comparable financial transaction records are analyzed to generate a recommendation (Step 210) in accordance with one or more embodiments of the invention. After analyzing the financial transaction records, the recommendation generator may evaluate a one or more of the following payment management options that include, but are not are not limited to the following examples: financing, payment method change, invoice terms change, investment offer, and customized option. Depending on the payment management option(s) to be evaluated, the recommendation generator perform additional analysis of the subset of the comparable financial transaction records. Statistical analysis may be performed to identify conditions by which a customer is more likely to pay early or on time. For example, the statistical analysis may compare the conditional probability of invoice terms with the payment time to determine whether the particular invoice terms affected the payment times.

For example, the first analysis of the subset of the comparable financial transaction records indicates that a customer has a propensity to pay on time, if there the customer is given a discount on an invoice for a limited time, and pay a greater percentage of the amount due, depending on the rate of the discount. In a more specific example, consider a scenario in which a customer is 20 days late and only pays $5,000 out of $10,000, another analysis is performed to determine the payment terms that will provide the vendor with the most payment possible on the payment date; and the result is a 10% discount in the next 5 days will likely incent the customer to pay $8,500 before the payment date (i.e., if the vendor chooses the invoice terms change option).

As another example generating a recommendation, suppose an analysis performed on a customer's comparable payment transaction records reveals a bimodal distribution (i.e., a curve with two distinct peaks) that compares a target customer's spending vs. days elapsed in a fiscal year (e.g., the first peak is on day 50, the second peak is on day 200). Further analysis reveals that the two peaks occurred when two different vendor offered a one-month, 10% invoice discount before each peak (e.g., the first on day 40, the second on day 195). Given that finding, a recommendation may be generated to advise the vendor to offer a one-month, 10% discount on day 250.

In one or more embodiments of the invention, a recommendation is presented (Step 212). The recommendation may be presented in the UI as a cash-generation option, as a simply dialog window and button, or any other design. For example, a recommendation to add a payment type may be presented as a dialog window that states, "We have discovered that your customer will pay on-time and in-full, if you add an online credit card payment system. Would you like to find out more?", a button that shows "Yes, show me the way!", and another button that shows "No, another time".

In one or more embodiments of the invention, a determination is made whether to send additional detail (Step 214), about the recommendation presented. Since a recommendation may as a brief description within an option, the brief description may not be enough information for the user to make a decision. Therefore, if the user is interested, the user may want to see more information. The user's response from Step 212 is received before performing the requested action sending the additional detail.

If the determination is made not to send additional information, the end state of the FIG. 2 flowchart is reached. If the determination is made to send additional information, then a report that anonymizes the comparable vendors and the subset of financial transaction records while maintaining detail of financial transactions with the target vendor is generated (Step 216) in accordance with one or more embodiments of the invention. In other words, the report may show a financial transaction history between the customer and the vendor. The financial transactions the customer had with comparable vendors are anonymized (because only transmitting the results of computations, not content of the transactions), enabling the vendor to perform customized payment management, without revealing sensitive, or private information, that the vendor should not, and could not normally, know. The report may also include one or more of the following: a confidence score, projected cash generated, and expected payment date. In one or more embodiments of the invention, the report is presented (Step 218), through the UI.

FIG. 3 shows a flowchart for managing a cash balance in accordance with one or more embodiments of the invention. In one or more embodiments of the invention, a set of cash balances of a target vendor for a time period is determined (Step 302). The set of cash balances is a series of cash balance corresponding to a series of moments in time, i.e., a series of cash balance "snap shots" in a time period. Determining a set of cash balances is a matter of determining the moments in time for calculating cash balances. Generally, the determination of the moments in time is done by determining time intervals for a given time period. For example, Step 302 starts with determining the time period, then determining the time interval, then iterating with each time interval and calculating the cash balance at each moment in time. For example, a 3 period of 1 day intervals is determined. Suppose on day 0 the balance is $1,000, then suppose $1,000 is expected to be collected on day 1, $2,500 is expected to be paid on day 2, and $1000 expected to be collected on day 3. The set of cash balances is {$1,000, $2,000, -$500, $500} corresponding to the time moments {day 0, day 1, day 2, day 3}.

In one or more embodiments of the invention, a negative cash balance is identified (Step 304). A positive cash balance is the state of a business possessing cash. A negative cash balance is the state of a business owing cash. A negative cash balance is identified from the set of cash balances. Generally, the soonest negative cash balance expected is identified. From the previous example in Step 302, the business has a negative cash balance on day 2.

The negative cash balance is presented to the target vendor (Step 306) in accordance with one or more embodiments of the invention. Moreover, the negative cash balance is presented through a UI. Additionally, the negative cash balance may be presented as part of, or combination of, a cash flow graph, written text, cash bar, or other graphical elements. Moreover, a cash management option may also be presented to the user. Generally, a vendor may want to know whether a negative cash balance may exist, in order to prevent a severe disruption to business. Consequently, the vendor may need to raise cash quickly thus the vendor may choose a cash management option for raising cash, and the cash management option may be for the vendor to request a loan from a lender. For example, a negative cash balance of −$15,000 occurring in 10 days has been obtained. The UI may display a dialog box stating "It looks like you will need to pay $15,000 in expenses in 10 days. We have found that you may be qualified for a loan of $15,000. Would you like to make a loan request?", a button that shows "Yes", and another button that shows "No".

In one or more embodiments of the invention, a determination is made whether to request a loan from a lender (Step 308). If the determination is made to not request the loan (e.g., the vendor declined requesting a loan), the end state of the FIG. 3 flowchart is reached. If the determination is made to request the loan, then a loan request is transmitted to the lender (Step 312) in accordance with one or more embodiments of the invention. Generally, the negative cash balance is transmitted in the form of a loan request to the lender. For example, the negative cash balance of −$15,000 is transmitted as a loan request of $15,000 to the lender. In one or more embodiments of the invention, the loan request may include the payment prediction. Thus, an affiliated lender may review the payment prediction in order to gauge the likelihood that the vendor will re-pay the loan.

FIG. 4 shows a flowchart for managing a business opportunity in accordance with one or more embodiments of the invention. In one or more embodiments of the invention, a specification of a business opportunity is received (Step 402). The specification of a business opportunity may be received from a user, a financial institution, other vendors, or other business entity. For example, a discount inventory opportunity, entered by the user, is received. In another example, an opportunity to invest in a CD may be received. The specification of a business opportunity may include a monetary amount needed, a deadline, and opportunity type. For example, there may be a business opportunity to buy discount inventory for $8,000 within the next 10 days.

In one or more embodiments of the invention, a deadline and required money amount are obtained from the specification of a business opportunity (Step 404). Essentially, the deadline and required money amount may be copied, referenced, or loaded for upcoming calculations. For example, the values may be $8,000 and 10 days.

An expected money amount at the deadline is determined, using the payment prediction (Step 406), in accordance with one or more embodiments of the invention. In other words, given the one or more payment predictions, the expected amount of money in possession at the deadline is determined. Performing the payment prediction may be as discussed above with reference to Step 208 of FIG. 2. The payment prediction may be performed for each available invoice of the target vendor. For example, if the predictions are for collecting $2,000 on day 8 and $14,000 on day 12, but the deadline is for day 10, then $2000 is expected to be in possession of the vendor on day 10.

A difference between the required monetary amount and the expected monetary amount at the deadline is determined (Step 408), in accordance with one or more embodiments of the invention. This is a determination of extra money needed at the deadline. For example, if the predictions are for collecting $2,000 on day 8 and $14,000 on day 12, but the vendor needs $8,000 for the deadline on day 10, then the difference will be $8,000-$2,000, or $6,000 more needed.

In one or more embodiments of the invention, a modification to a payment term in the invoice is identified (Step 410). Generally, the modification is made to payment amount and payment deadline, but other types of modifications can be made. For example, a modification may include a deadline by day 9, with a 1% discount for a full payment, and pro-rated for a partial payment; yielding an extra $500 in payment before the deadline.

In one or more embodiments of the invention, a determination is made whether a modification results is more than the net cash need at the deadline (Step 412). The net cash need is the difference, at a moment in time, between the total cash needed by a business and the total cash in possession of the business. Moreover on Step 412, the determination on whether a modification meets or exceeds the net cash needed at the deadline, demonstrates a possible option for helping a business realize a business opportunity, if the determination is affirmative. For example, if the predictions are for collecting $2,000 on day 8 and $14,000 on day 12, but the vendor needs $8,000 for the deadline on day 10, thus there will not be sufficient cash because $6,000 more is needed on day 10.

A modification may include a payment amount discount. In one or more embodiments of the invention, if a discount is provided, cash collection may increase due to customers incented to pay sooner, and simultaneously cash collected is also reduced because the discount requires the customers to pay less. For example, if the same conditions from the previous example exist, and if there is a modification to give all customers a 10% discount off the payment amount due until day 9, and if the first and second customer pay in full on day 10, then $6,400 net cash will be the result. The calculation is done with the following: add the first customer's payment, ($2,000−(10% of $2,000))=$1,800, to the second customer's payment ($14,000−(10% of $14,000))= $12,600, for the total payments collected ($1,800+ $12,600)=$14,400. Then calculate net cash by taking the total payments collected and subtracting the vendor's cash need, ($14,400−$8,000)=$6,400. In this case, the vendor has exceeded net cash need, therefore the vendor will be able to realize the business opportunity.

Although not presented in FIG. 412, an additional determination may be made whether the modification results in a long term loss that is greater than the expected gain on realizing the opportunity. If the modification in the long terms results in a net long term loss, the modification may be ignored for further processing in accordance with one or more embodiments of the invention.

For example, a determination may be made as to whether issuing a modification of a discount would result in the discounted amount being more than the amount that the vendor expects to receive from the opportunity. If the discounted amount is more, then such modification may be disregarded. In some scenarios, such modifications may be presented, but flagged to the vendor. For example, the vendor may opt to take a long term loss in favor of the short term gain.

If the net cash is insufficient, a determination is made whether another modification exists (Step 416) (described further below) in accordance with one or more embodiments of the invention. If the net cash is sufficient, the modification is added to a list (Step 414) in accordance with one or more embodiments of the invention. The list maintains a set of possible modifications. For example, the list may have 3 payment term modifications for: 3% discount yielding $1,000 surplus at the deadline, 5% discount yielding $3,000 surplus at the deadline, and 10% discount yielding $6,400 surplus at the deadline.

In one or more embodiments of the invention, a determination is made whether another modification should be identified and evaluated (Step 416). Generally, a range of payment terms are determined. For example, 10 modifications, increasing discounts by 1% from a 1% discount to a 10% discount may be determined. If any modifications remain, then the medication will be identified (Step 410).

If no more modifications remain, then an optimal modification from a list is selected (Step 418) in accordance with one or more embodiments of the invention. The optimal modification is selected based on having a result that achieves the monetary requirements for the business opportunity while minimizing the next long term loss. In other words, an optimal modification will raise just enough cash to realize the vendor's cash need at the deadline, while reducing long term loss in cash collection due to excessive discounting. For example, the list may have 3 payment term modifications, with a deadline, for: a 5% discount yielding $1,000 cash surplus but a $500 loss, a 10% discount yielding $3,000 but a $1,000 loss, and 50% discount yielding $2,000 but a $5,000 loss; the optimal choice would be the 5% discount. Even though the other two choices have greater surpluses, greater surpluses are unnecessary, but reducing loss is still important.

In one or more embodiments of the invention, a recommendation is generated with the optimal modification (Step 420). The generated recommendation includes the optimal modification thus making available a cash optimization opportunity for the vendor at a specified time. In one or more embodiments of the invention, the recommendation may be presented in the graphical user interface.

FIG. 5.1 shows an example of financial transaction record validation. In this example, a customer has 100 financial transaction records with comparable vendors. The customer consistently pays early by 1 day and pay $120, therefore a reasonable prediction is that the customer will pay $120, and 1 day early. However, financial transactions may be submitted erroneously or fraudulently and even a single error can ruin a prediction. In the example, record N has an error with an extraordinarily high payment amount of $10,000,000. If the prediction is calculated by doing an average, the predicted payment amount would be approximately $100,000. Record M, represents another type of error. The payment date was submitted incorrectly, leading to a submission that is 50 years past due, and may cause the prediction result to indicate the customer will pay half a year late! However, the validation engine detects and removes these erroneous financial transaction records from the comparison set preserving authentic data for an accurate prediction; the prediction result once again indicates a payment amount of $120 and 1 day early.

FIG. 5.2 shows an example design of a customer financial transaction profile (550). The customer financial transaction profile (560) is an assembly of information about a customer with an intention of understanding the customer's financial transactional behavior. The customer financial transaction profile (560) includes a customer record (560), a set of payment records (570), and a prediction record (580). The customer record (560) includes standard customer information for identifying or communicating a customer. The set of payment records (570) show a history of the customer's payments. The customer's payment history show varying payment dates and payment amounts. A payment record includes an amount paid, amount due, and pay date. The prediction record (580) includes a predicted payout, predicted pay time, and payment reliability rating. The predicted payout may be shown relative to the payment amount due. For example, the predicted payout may be shown as 90% payout, $108/$120, or other representation. The predicted payout may be shown absolutely too. For example, $108 or other representation. The predicted pay time may shown relatively. For example, 2 days late, +2 days, or other representation. The predicted pay time may shown absolutely. For example, 8/13/15 or other representation. The predicted pay time may have any format of time or date. The payment reliability may be shown in different formats in accordance with one or more embodiments of the invention. For example, "3 starts", "0.7", "80%", or other representations.

FIG. 6.1 shows an example screen for a Cash Opportunity Analyzer, comprising a UI, in accordance with one or more embodiments of the invention. This example introduces Larry, who is evaluating a cash opportunity of an investment. The top section of the screen is an input area that includes a cash needed field (602), a cash purpose field (604), an expected money return field (606), a time of execution field (608), an expected time for profit field (610), and an options area (612). The cash needed field (602) is the amount of cash the user needs for the opportunity. The cash purpose field (604) may be a list of money making opportunities. Examples include on or more of the following, the purchase of discount inventory, short-term venture, stock purchase, etc. The expected money return field (606) is the expected money to be made from the investment. The time of execution field (608) is when the user wants to take the opportunity. The an expected time for profit field (610) is the expected time to realize the expected profit. In this example, Larry needs $8,000 cash to purchase inventory, in order to make $12,000 in less than 60 days. He wants buy immediately, but he wants to consider his best options for raising the cash for his investment purchase.

The options area (612), is a set of options the vendor could choose from to acquire cash. The first option (620) shows a financing option (622), a confidence score (624), a description of the financing option (626), and a selection button (628). The second option (630) shows an invoice term change option (632), a confidence score (634), a description of the invoice term change option (636), and view button (638). The third option (640) is an empty option, with an explore additional options button (642). Larry is already presented with two options, the first option may be to select a financing offer, and the second option may be the invoice terms change. In a first glance comparison, the financing offer is quicker and more likely to provide Larry the cash. The invoice terms change, is slightly less likely to provide Larry the cash, much less provide the cash to Larry quickly, however he would not have to take on any debt. If Larry is interested in any of the options, he can just click on the button and find out the details and at the very least, make a more informed decision. If Larry doesn't like either of the options, he can click on the explore additional options button (642), to find options that may better match his preferences.

FIG. 6.2 shows an example UI for and an aspect of payment management. The UI includes a cash bar (660) and payment collection recommendation (670). The cash bar is includes a payments collected section and an accounts receivable section. The payments collected section includes a section for cash collected greater than 30 days ago, and cash collected in the past 30 days. The accounts receivable section may include four time blocks: the next 30 days, the following 30 days, another 30 days ahead, and the projected uncollectable. The shaded region within the 2nd and 3rd time blocks represent payments that could be collected more quickly. The payment recommendation (670) includes a description about the payments that could be collected more quickly and about the extra cash that could be collected, and a selection button for accepting the recommendation. Overall, the cash bar provides a "snap shot" of the vendor's cash situation, more specifically cash collection situation. FIG. 6.2 may represent what Larry (from FIG. 6.1) would see, if he chose to see recommendation details under the Invoice Terms Change Option. In Larry's case, the extra $2,400 gained from turning on payments is not going to be enough for has $8,000 cash need. However, he may want to turn on payments anyway, and find a smaller loan afterwards.

The above examples are for explanatory purposes only and not intended to limit the scope of the invention.

Figure 7:
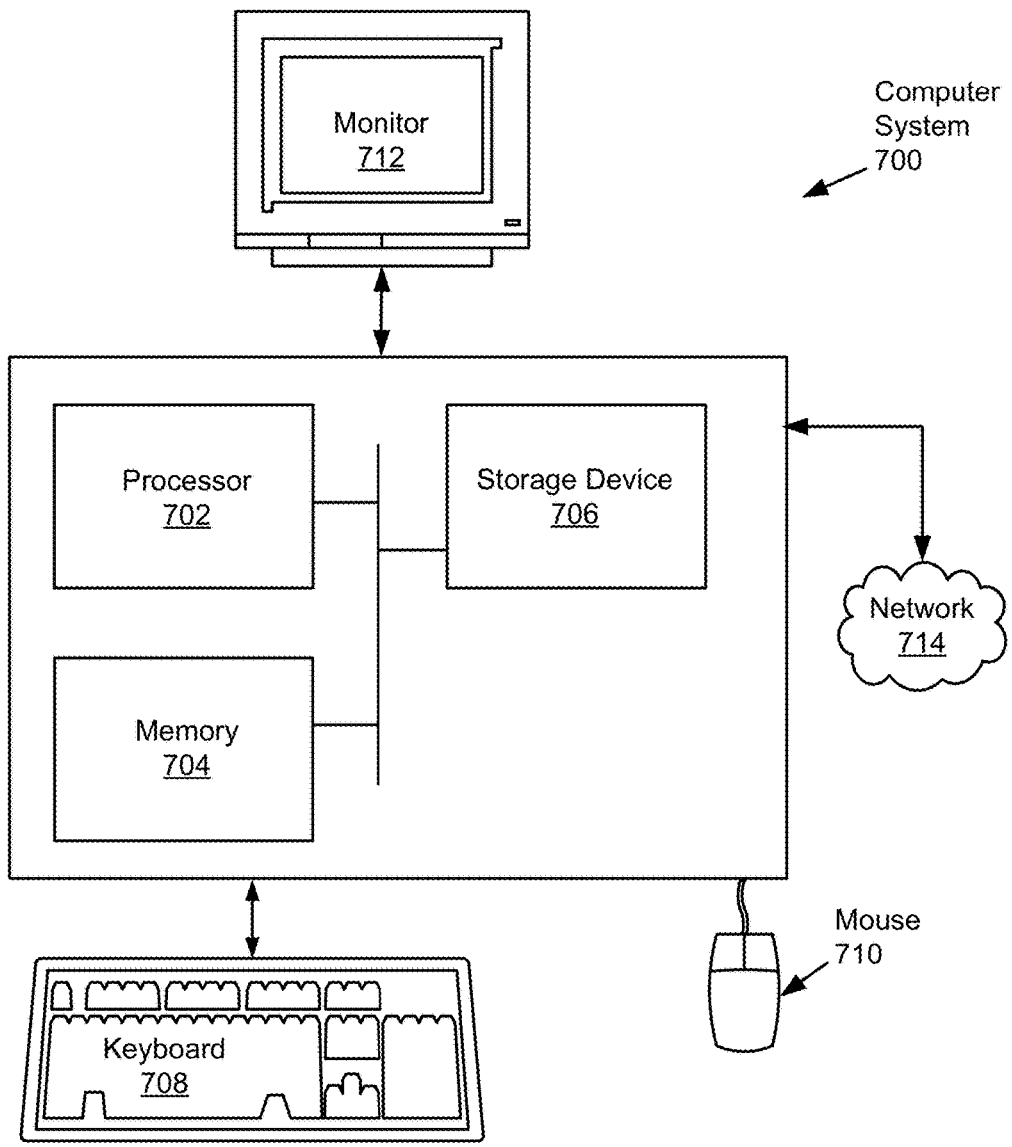
FIG. 7 shows a computing system in accordance with one or more embodiments of the invention.

Embodiments of the invention may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and connected to the other elements over a network (712). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for making recommendations for payment management, wherein the payments relate to outstanding amounts owed by customers to a target vendor who is a vendor to the customers, the method comprising:
   providing a computing network comprising computing devices in communication with one another, wherein each of the customers of the target vendor, the target vendor, a plurality of other customers, a plurality of other vendors, and a plurality of financial institutions are provided with a computing device in communication with a recommendation computing device, each of the computing devices comprising at least a processor and a graphical user interface;
   providing a financial application which is executing on the processor of the recommendation computing device, wherein the financial application is configured to execute instructions to carry out the payment management functions, comprising:
      generating, on the graphical user interface of the target vendor computing device, a first screen, comprising:
         a business opportunity portion of the first screen for receiving a specification of a business opportunity available to the target vendor; and
         a financing portion of the first screen for presenting to the target vendor at least two options for financing the specified business opportunity;
      wherein the business opportunity portion of the graphical user interface of the target vendor comprises:
         a first field of the business opportunity portion to receive a required monetary value to realize the business opportunity,
         a second field of the business opportunity portion to receive an expected payout for realizing the business opportunity, and
         a third field of the business opportunity portion to receive a deadline to realize the business opportunity;
      receiving, from the graphical user interface of the target vendor, the specification of the business opportunity;
      identifying, a plurality of invoices for a plurality of target financial transactions between the customers of the target vendor and the target vendor;
      obtaining, a plurality of financial transaction records for a plurality of completed financial transactions between the customers of the target vendor and the other vendors, the other vendors comprising a plurality of vendors who are comparable to the target vendor;
      generating, using the plurality of financial transaction records, a payment prediction for each of the customers of the target vendor to pay the target vendor, wherein the payment prediction comprises a prediction of a timing or manner of payment by each customer of the amounts owed to the target vendor;
      generating a confidence score for each of the payment predictions for each of the customers, wherein generating the confidence score comprises;
         analyzing, using mathematical and business rules, for each financial transaction record of the plurality of financial transaction records, a plurality of attributes that define a degree of similarity between the financial transaction record and the target financial transactions, wherein the attributes comprise at least the degree of similarity between the comparable vendors and the target vendor;
         assigning, for each of the financial transaction records, a confidence score for the payment prediction; and
         aggregating the confidence score for the plurality of financial transaction records;
      aggregating the payment predictions and the confidence score for all of the customers of the target vendor to generate an aggregated payment prediction and aggregated confidence score for the target vendor;
      analyzing a first subset of the plurality of financial transaction records for the plurality of comparable vendors to generate a recommendation, wherein the recommendation is associated with the business opportunity;
      determining, based on the aggregated payment prediction, a difference between the required monetary value and an expected amount available at the deadline;
      presenting, using the graphical user interface of the target vendor, in the financing portion of the first screen, a debt financing option for financing the business opportunity and a payment management option for financing the business opportunity, wherein presenting the payment management option comprises at least:
         presenting, in a first field of the financing portion, a recommendation for changing terms of the plurality of invoices;
         presenting, in a second field of the financing portion, the aggregated confidence score; and
         presenting, in a third field of the financing portion, a view button for viewing additional information associated with the recommendation;
      presenting, using the graphical user interface and in response to selection of the view button, a second screen presenting the aggregated payment prediction, wherein presenting the aggregated payment prediction comprises at least:
         presenting, in a first field, a cash flow to be generated from the payment prediction;
         presenting, in a second field, the additional information associated with the recommendation; and
         presenting, in a third field, an input element for receiving the target vendor's selection of the recommendation; and
      communicating to the customers of the target vendor, in response to receiving the target vendor's selection of the recommendation, changes to the terms of the plurality of invoices.

2. The method of claim 1, further comprising:
   receiving, via the graphical user interface, a request for additional detail for the payment prediction;
   generating, in response to the request, a report anonymizing the plurality of comparable vendors and the first subset of the plurality of financial transaction records;
   transmitting the report.

3. The method of claim 2, wherein the report maintains detailed identification for a second subset of the plurality of financial transaction records for the target vendor.

4. The method of claim 1, further comprising:
determining cash flow of the target vendor for a time period, the cash flow accounting for a payment of the invoice based on the payment prediction;
identifying, in the cash flow, a deficit; and
transmitting, to a lender, information about the deficit and the payment prediction.

5. The method of claim 1, further comprising:
validating the plurality of financial transactions using a commerce network.

6. The method of claim 1,
wherein generating the recommendation comprises identifying a change in a term of an invoice that results in a loss of less than the expected payout, and, by the deadline, the difference being paid by the customer.

7. A system for payment management, the system comprising:
a data repository for storing a plurality of financial transaction records;
a computer processor; and
instructions operatively connected to the data repository and, when executed on the computer processor:
identify an invoice for a target financial transaction between a customer and a target vendor;
obtain a plurality of financial transaction records for a plurality of completed financial transactions between the customer and a plurality of vendors, the plurality of vendors comprising a plurality of comparable vendors and the target vendor;
generate, using the plurality of financial transaction records, a payment prediction for the customer to pay the target vendor;
present, using a graphical user interface and in a first screen, a specification of a business opportunity available to the target vendor, wherein the specification comprises a required monetary value and a deadline to realize the business opportunity;
analyze a first subset of the plurality of financial transaction records for the plurality of comparable vendors to generate a recommendation associated with the business opportunity; and
determine, based on the payment prediction, a difference between the required monetary value and an expected amount available at the deadline of the business opportunity;
present, using the graphical user interface and in the first screen, a debt financing option for financing the business opportunity and a payment management option for financing the business opportunity, wherein presenting the payment management option comprises at least:
presenting, in a first field of the first screen, the recommendation, wherein the recommendation relates to a change in a term of the invoice;
presenting, in a second field of the first screen, an aggregated confidence score associated with the recommendation; and
presenting, in a third field of the first screen, a view button for viewing additional information associated with the recommendation;
present, using the graphical user interface, in a second screen, and in response to selection of the view button, the payment prediction and the recommendation, wherein presenting the payment prediction and the recommendation comprises at least:
presenting, in a first field of the second screen, a cash flow to be generated from the payment prediction,
presenting, in a second field of the second screen, the additional information associated with the recommendation, and
presenting, in a third field of the second screen, an input element for receiving a selection of the recommendation.

8. The system of claim 7, further comprising instructions that, when executed on the computer processor:
receive, via the graphical user interface, a request for additional detail for the payment prediction;
generate, in response to the request, a report anonymizing the plurality of comparable vendors and the first subset of the plurality of financial transaction records; and
transmit the report.

9. The system of claim 7, further comprising instructions that, when executed on the computer processor:
determine cash flow of the target vendor for a time period, the cash flow accounting for a payment of the invoice based on the payment prediction;
identify, in the cash flow, a deficit; and
transmit, to a lender, information about the deficit and the payment prediction.

10. The system of claim 7, further comprising instructions that, when executed on the computer processor:
validate the plurality of financial transactions using a commerce network.

11. The system of claim 7, further comprising instructions that, when executed on the computer processor:
generate a confidence score for the payment prediction, wherein generating the confidence score comprises:
assigning, for each financial transaction record of the plurality of financial transaction records, a similarity score to the financial transaction record based on a number of attributes of the financial transaction record matching the target financial transaction, and
aggregating the similarity score for the plurality of financial transaction records.

12. The system of claim 7, further comprising instructions that, when executed on the computer processor:
receive, in the graphical user interface, a specification of the business opportunity, the specification defining the required monetary value to realize the business opportunity, an expected payout for realizing the business opportunity, and the deadline to realize the business opportunity,
wherein generating the recommendation comprises identifying the change in a term of the invoice that results in a loss of less than the expected payout, and, at the deadline, the difference being paid by the customer.

13. A non-transitory computer readable medium for payment management, the non-transitory computer readable medium comprising computer readable program code for:
identifying an invoice for a target financial transaction between a customer and a target vendor;
obtaining a plurality of financial transaction records for a plurality of completed financial transactions between the customer and a plurality of vendors, the plurality of vendors comprising a plurality of comparable vendors and the target vendor;
generating, using the plurality of financial transaction records, a payment prediction for the customer to pay the target vendor;
presenting, using a graphical user interface and in a first screen, a specification of a business opportunity available to the target vendor, wherein the specification comprises a required monetary value and a deadline to realize the business opportunity;

analyzing a first subset of the plurality of financial transaction records for the plurality of comparable vendors to generate a recommendation associated with the business opportunity; and determining, based on the payment prediction, a difference between the required monetary value and an expected amount available at the deadline of the business opportunity;

presenting, using the graphical user interface and in the first screen, a debt financing option for financing the business opportunity and a payment management option for financing the business opportunity, wherein presenting the payment management option comprises at least:

presenting, in a first field of the first screen, the recommendation, wherein the recommendation relates to a change in a term of the invoice;

presenting, in a second field of the first screen, an aggregated confidence score associated with the recommendation; and presenting, in a third field of the first screen, a view button for viewing additional information associated with the recommendation;

presenting, in the graphical user interface, in a second screen, and in response to selection of the view button, the payment prediction and the recommendation, wherein presenting the payment prediction and the recommendation comprises at least:

presenting, in a first field of the second screen, a cash flow to be generated from the payment prediction, presenting, in a second field of the second screen, the additional information associated with the recommendation, and presenting, in a third field of the second screen, an input element for receiving a selection of the recommendation.

14. The non-transitory computer readable medium of claim 13, further comprising computer readable program code for:

receiving, via the graphical user interface, a request for additional detail for the payment prediction;

generating, in response to the request, a report anonymizing the plurality of comparable vendors and the first subset of the plurality of financial transaction records; and transmitting the report.

15. The non-transitory computer readable medium of claim 13, further comprising computer readable program code for:

determining cash flow of the target vendor for a time period, the cash flow accounting for a payment of the invoice based on the payment prediction;

identifying, in the cash flow, a deficit; and transmitting, to a lender, information about the deficit and the payment prediction.

16. The non-transitory computer readable medium of claim 13, further comprising computer readable program code for:

validating the plurality of financial transactions using a commerce network.

17. The non-transitory computer readable medium of claim 13, further comprising computer readable program code for:

generating a confidence score for the payment prediction, wherein generating the confidence score comprises:

assigning, for each financial transaction record of the plurality of financial transaction records, a similarity score to the financial transaction record based on a number of attributes of the financial transaction record matching the target financial transaction, and aggregating the similarity score for the plurality of financial transaction records.

18. The non-transitory computer readable medium of claim 13, further comprising computer readable program code for:

receiving, in the graphical user interface, a specification of the business opportunity, the specification defining the required monetary value to realize the business opportunity, an expected payout for realizing the business opportunity, and the deadline to realize the business opportunity, wherein generating the recommendation comprises identifying the change in a term of the invoice that results in a loss of less than the expected payout, and, by the deadline, the difference being paid by the customer.

* * * * *